No. 651,376. Patented June 12, 1900.
O. MORRILL & H. P. WELLS.
BALL BEARING.
(Application filed Jan. 26, 1900.)
(No Model.)
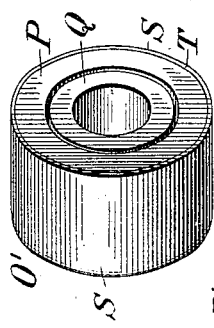
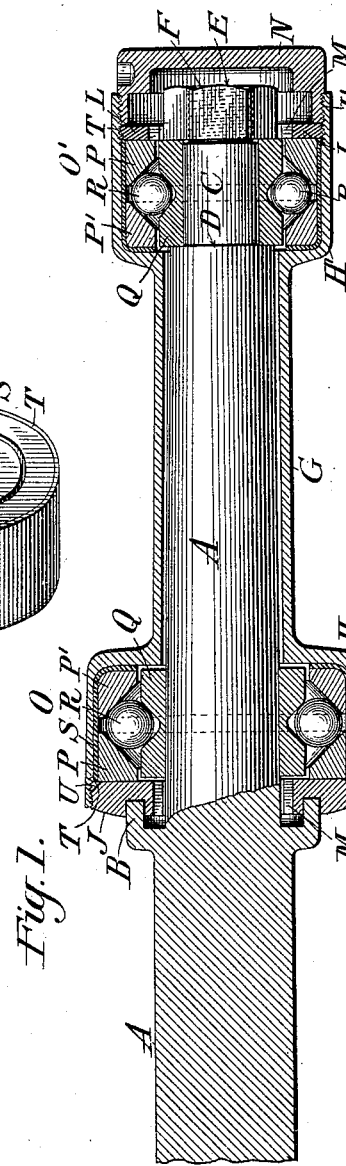
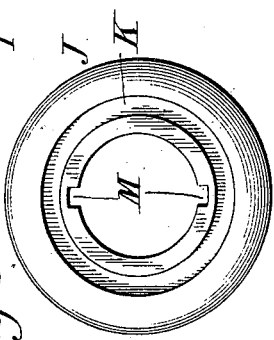
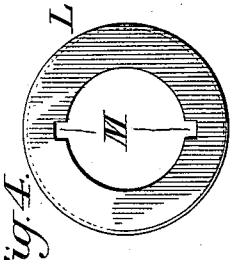
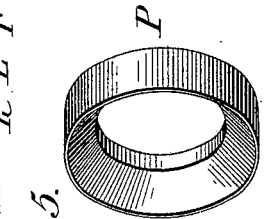
Witnesses
R. A. Balderson
O. L. Taylor
Inventors:
Osgood Morrill,
Harlan P. Wells.
By F. E. Stebbins
Their Attorney.

UNITED STATES PATENT OFFICE.

OSGOOD MORRILL AND HARLAN P. WELLS, OF AMESBURY, MASSACHUSETTS.

BALL-BEARING.

SPECIFICATION forming part of Letters Patent No. 651,376, dated June 12, 1900.

Application filed January 26, 1900. Serial No. 2,926. (No model.)

*To all whom it may concern:*

Be it known that we, OSGOOD MORRILL, a citizen of the United States, and HARLAN P. WELLS, a subject of the Queen of Great Britain and Ireland, residing at Amesbury, in the county of Essex and State of Massachusetts, have invented certain new and useful Improvements in Ball-Bearings, of which the following is a specification.

The object of our invention is the production of a ball-bearing which shall be comparatively simple in construction and not liable to become deranged or inoperative; which will wear evenly; which shall have the balls confined or held in combination with rings or between them in such a way as to form a cage, so that the balls and rings can be adjusted and removed together without the separation of the rings and the displacement of the balls; which shall admit of the adjustment of the rings relative to the balls for the purpose of compensating for wear; which shall have the parts so arranged and fitted one to another that dust and other foreign substances will be excluded from contact with the wearing surfaces, and which shall possess other desirable features and characteristics constituting it a superior device for performing the required functions.

With the above end in view our invention consists, objectively, in a ball-bearing comprising an axle or shaft, two cages embracing rings and balls, a hub or box having seats for the cages, and means for excluding dust and dirt.

It further consists in a cage for ball-bearings, said cage comprising an auxiliary casing within which is contained balls and rings in contact with the balls.

It further consists in a cage for ball-bearings, said cage comprising an auxiliary casing, two beveled rings, and a cylindrical ring, the rings and balls so held by the casing that the cage can be adjusted in operative position and removed without liability of the parts becoming disarranged or separated.

Finally, it consists in certain novelties of construction and combinations and arrangements of parts hereinafter set forth and claimed.

The accompanying drawings illustrate an example of the physical embodiment of our invention embracing two cages and their application to a vehicle-axle constructed and arranged according to the best of the several modes we have so far devised for the application of the principle.

Figure 1 is a view, partly in section, of the said example, showing a vehicle-axle, an axle-box, and two ball-bearing cages in position within the box and engaging the axle. Fig. 2 is a perspective view of a ball-bearing cage. Fig. 3 is a plan view of the rear threaded washer. Fig. 4 is a plan view of the front threaded washer. Fig. 5 is a perspective view of one of the beveled rings removed from the casing.

Referring to the several figures, the letter A designates an axle, shaft, or spindle.

B is a collar on the axle, said collar being provided with a circular flange extending parallel with the axle.

C is the end of the axle, somewhat reduced in diameter.

D is a shoulder.

E is the threaded end of the axle.

F is a threaded nut.

G designates an axle-box of any suitable construction.

H H' are enlarged portions of the box at the ends thereof forming seats.

I I' are internal screw-threads.

J is a threaded washer adapted to engage the threads I.

K is a circular groove in the face of the washer adapted to receive the flange of the collar B on the axle.

L is the threaded washer, adapted to engage the threads I' at the front end of the box.

M are notches or recesses in the rear and front washers adapted to receive a wrench.

N is an externally-threaded cap adapted to engage the threads I' at the front end of the box.

O O' are ball-bearing cages.

P P' are beveled rings.

Q is a grooved cylindrical ring.

R are the balls.

S S designate the auxiliary metallic casings which receive the beveled rings and balls and hold them in combination with the cylindrical rings Q, as shown in Fig. 1.

T T are the circular edges of the casings, and U designates the beveled edge of the washer J, located at the inner end of the box.

It will be observed that each cage comprises, in addition to the series of balls, four parts—the cylindrical ring, two beveled rings, and the casing. The cylindrical ring is grooved to receive the balls. The beveled rings frictionally engage the inner surface of the casing sufficiently to prevent their displacement in ordinary handling, and the casing has one end turned or spun inwardly to a distance about equal to the thickness of a beveled ring, so as to leave an opening slightly larger than the diameter of the cylindrical ring. When the parts are assembled, the cage appears as in Fig. 2.

To assemble the parts of the complete ball-bearing, the cages are first adjusted to their seats within the enlarged ends H H' of the box. The washers J and L are next screwed tight against the cages by means of a wrench which fits the notches M. The axle is then passed through the cylindrical rings Q, and finally the nut F and cap N are applied. As shown by the drawings, Fig. 1, the nut contacts with the end of the cylindrical ring Q and forces it against the shoulder D, so it cannot turn about the axle. By lengthening the reduced part of the axle C the ring Q may be allowed to turn about the axle. At the outer end of the axle or box the washer L is in contact with the edge T of the casing S. Should the rings or balls become worn, the cage can be removed and the edge T filed away slightly, which will allow the washer when applied to be screwed farther into the box, and thus take up the wear of the parts. To attain the same end, the washer may be beveled, as at U, which allows it to be advanced into the box and its edge not come in contact with the edge T of the casing.

From the foregoing it is obvious that we have produced a ball-bearing which fulfils all the conditions set forth as the object or purpose of our invention. Dust and foreign substances are effectively excluded by means of the collar B, having a flange which fits the groove K in the washer J at the rear and the cap N at the front. Each cage can easily be placed in position and removed and handled without the parts becoming separated and the wear of the parts taken up by means of the washers J and L.

While we have illustrated and described only one complete example of the physical embodiment of our invention and one specific construction of the cage, and that example embracing a vehicle axle and hub, we do not thereby intend to limit the scope thereof to such example. We may embody the invention in a combination in which the box is stationary and the axle or spindle or shaft turns or revolves. Changes in construction may likewise be introduced. The box and its central passage may be of the same diameter from end to end and means provided to serve as seats for the cages. In certain cases the collar B and the cap N may be omitted. The cages may be held in their seats by positive means, such as a screw, and the beveled rings may be confined in the cages by other means than the frictional engagement with the casing. We also contemplate the use of the cages in other analogous combinations and sometimes propose to use a single cage at the end of the axle to serve as a thrust-bearing, especially where the weight of the load is to be taken directly by the axle or spindle A of a vehicle. These and other modifications and specific applications of the cage or cages we intend to include within the scope of our invention.

What we claim as new, and desire to secure by Letters Patent, is—

1. A ball-bearing cage comprising an auxiliary cylindrical casing; two beveled rings frictionally held within the casing and out of contact each with the other; a grooved cylindrical ring; and a series of balls in contact with the groove of the cylindrical ring and the beveled surfaces of the beveled rings; the ring and balls being held within the auxiliary casing so that the cage can be removed from the bearing and handled without the liability of displacing the elements held by the casing.

2. A ball-bearing cage comprising an auxiliary casing, S, having one end turned inwardly; two beveled rings, P P'; a grooved cylindrical ring, Q; and a series of balls, R; the said rings, P P', being held within the casing by the frictional contact of their outer circumferential surfaces with the inner surface of the casing.

3. The combination in a ball-bearing of a box having two seats, one at each end; two ball-bearing cages, each cage embracing an auxiliary casing, two beveled rings, a cylindrical ring, and balls, and a cage located in each seat; means for holding the cages in the seats; an axle or spindle; and means for retaining the axle within the box.

4. The combination in a ball-bearing, of a box having two seats; two cages, each cage comprising an auxiliary casing, two beveled rings, a cylindrical ring, and balls; an axle or spindle; a nut; and two washers, one fitting within each seat and against a cage and holding the same in a fixed position within the box.

5. The combination in a ball-bearing, of a box having seats; a ball-bearing cage in each seat; washers bearing against the cages; and an axle; said axle having a collar and flange, and one of the washers having a groove, K, to receive the flange of the axle.

6. The combination in a ball-bearing, of a threaded box having seats; a ball-bearing cage in each seat, said cage comprising an auxiliary casing, two beveled rings, a cylindrical ring, and balls; threaded washers engaging the threaded box and bearing against the cages; and means for retaining the axle within the box.

7. The combination in a ball-bearing, of a box having seats; a ball-bearing cage in each seat, each of said cages having a ring, P; an axle; and a washer beveled at U bearing against a ring, as and for the purpose set forth.

8. The combination in a ball-bearing, of a threaded box having two seats; a ball-bearing cage comprising an auxiliary casing, two beveled rings, a cylindrical ring, and balls located in each seat; an axle; a threaded washer, L; and a cap closing the end of the box containing the end of the axle and bearing against the threaded washer, L, when the said cap is advanced within the box.

9. The combination in a ball-bearing, of a box having seats; a ball-bearing cage comprising an auxiliary casing, two beveled rings, a cylindrical ring, and balls, located in each seat; an axle having an end reduced in diameter, the cylindrical ring of one of the cages fitting the reduced portion of the axle; and a nut engaging the ring and adapted to force it against the shoulder, D, of the axle.

In testimony whereof we affix our signatures in presence of two witnesses.

OSGOOD MORRILL.
HARLAN P. WELLS.

Witnesses:
HATTIE T. MORRILL,
GEORGE H. BRIGGS.